United States Patent Office 3,444,316
Patented May 13, 1969

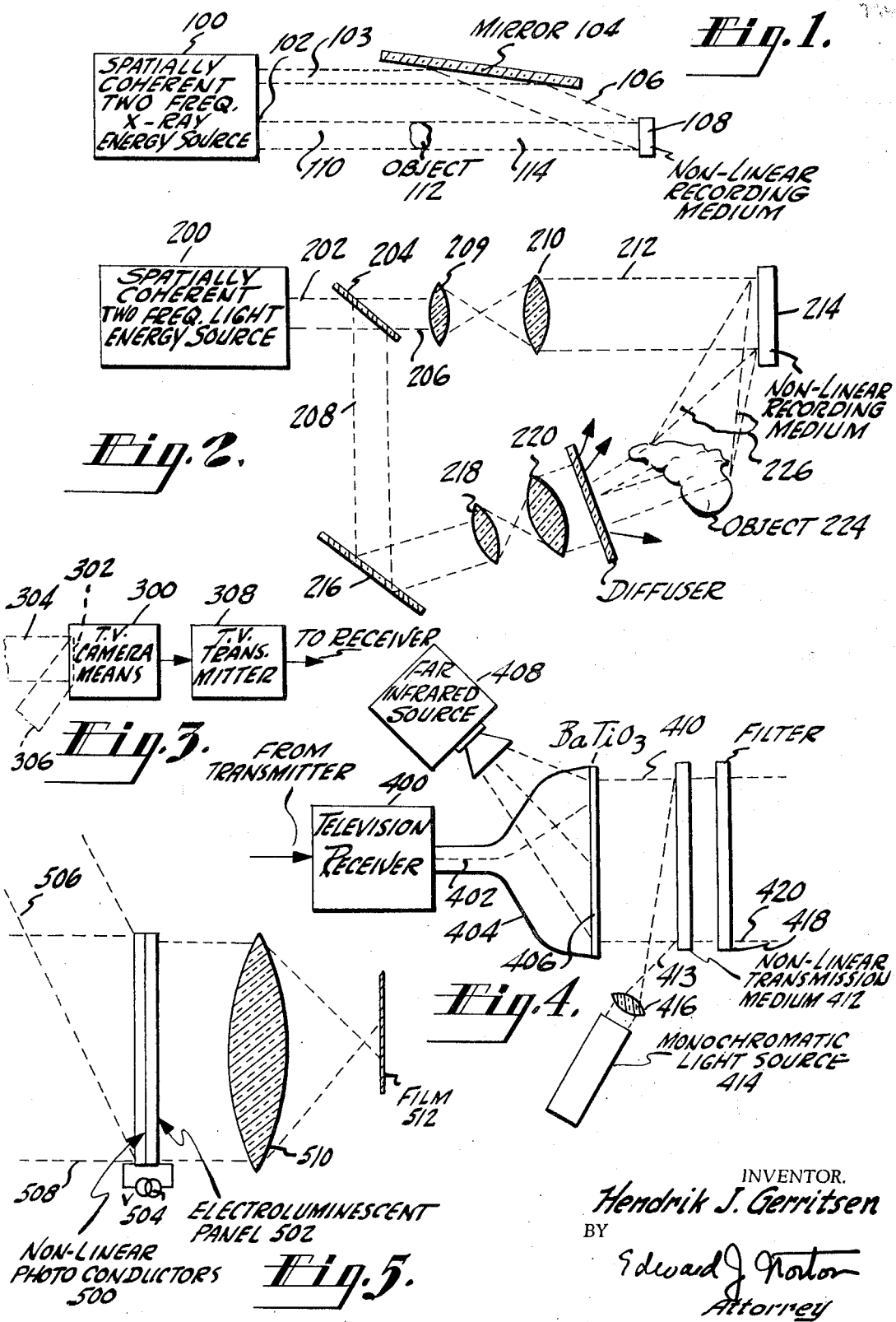

3,444,316
BEAT FREQUENCY HOLOGRAMS
Hendrik J. Gerritsen, Princeton Junction, N.J., assignor to Radio Corporation of America, a corporation of Delaware
Filed Feb. 3, 1966, Ser. No. 524,788
Int. Cl. H04n 9/54; G02b 27/00
U.S. Cl. 178—6.5      10 Claims

ABSTRACT OF THE DISCLOSURE

The recording on a non-linear medium of a hologram which is a function of the difference frequency between two narrowly separated frequencies with which the medium is illuminated. By this means an X-ray hologram at a difference frequency in the light spectrum may be formed from two X-ray frequency input signals. Similarly a difference frequency hologram in the infrared or far infrared, which may be transmitted by television or derived on a motion picture, may be formed from two light frequency input signals.

---

This invention relates to holograms and, more particularly, to holograms produced on a non-linear recording surface medium in response to the interference between a reference beam obtained directly from a source of spatially coherent monochromatic radiation composed of two different predetermined frequencies and an information beam obtained from an object illuminated by radiation from the same source.

At present, it is the practice to record holograms as the interference pattern produced by a reference beam obtained directly from a spatially coherent monochromatic visible light source, such as a laser, and an information beam obtained from an object illuminated by radiation from this source. The hologram interference pattern so formed is, of course, a function of the particular wavelength or frequency of the monochromatic light radiation from the source. Since the ultimate resolving power of recording mediums, such as photographic films, extends down to the wavelength of light, a hologram interference pattern in which the bits of information are spaced by a distance of the order of the wavelength of light may be recorded thereon. Such a hologram, when read out in the conventional way with light of comparable wavelength as was used in making the hologram, will reconstruct the original down to details approximately as small as the wavelength of the light used.

However, there are situations in which a resolving power in the order of the wavelength of light may be either too high or too low for a particular intended purpose. For instance, since a reconstructed hologram produces a three dimensional image which exhibits parallax between near and far elements of the scene, it would be highly desirable to record a hologram interference pattern at the wavelength of X radiation in a manner such that it could be reconstructed at a wavelength in the visible light spectrum. However, the ultimate resolving power of a recording medium is insufficient to record a hologram interference pattern at the extremely short wavelengths of X radiation. Thus, a resolving power in the order of the wavelength of light is too low to be used for the purpose of producing a hologram interference pattern at the wavelength of X radiation.

On the other hand, although it would be particularly desirable to be able to transmit by means of television a picture of a light hologram interference pattern to a remote location, the extremely large number of individual elements in such a picture and the extremely small area of each individual element make it impracticable by present techniques to do so. Thus, a required resolving power in the order of the wavelength of light is too high to permit television transmission of a light hologram interference pattern.

The present invention contemplates producing a hologram interference pattern which is a function of the difference frequency between first and second given frequencies of electromagnetic radiation energy impinging on an electromagnetic recording surface medium having a response at each point thereof which is a predetermined single-valued non-linear function of the electromagnetic radiation energy impinging on that point. More particularly, if such a non-linear surface medium is exposed to an information component of radiation obtained from an object illuminated with radiation from a spatially coherent source of electromagnetic energy composed substantially of these first and second given frequencies and is simultaneously exposed to a reference component of radiation directly obtained from this source, an image is recorded on the surface medium which includes a hologram composed of an interference pattern which is a function of the difference frequency between these first and second given frequencies. If these first and second given frequencies are chosen to be very close to each other, the difference frequency therebetween will be very much lower than either the first or second given frequencies themselves. Therefore, the wavelength corresponding to this difference frequency will be very much greater than the wavelength corresponding to either the first or the second given frequencies. Thus, by employing the technique of the present invention, it is possible to choose as the first and second given frequencies two closely spaced frequencies within the X-ray spectrum which have a frequency difference therebetween which is within the light spectrum. In this case, although the recording medium may not have a resolving power sufficient to record the first and second given frequencies themselves, which are in the X-ray spectrum, the beat or difference frequency between them, which is within the light spectrum and therefore within the resolving power of the recording medium, results in a hologram interference pattern which is a function of this difference or beat frequency being recorded on the surface medium. This recorded hologram interference pattern, when reconstructed, produces a three-dimensional light image of the object which was illuminated with X radiation of the aforesaid first and second given frequencies.

If the first and second given frequencies are chosen in the light spectrum and differ by a frequency having a wavelength in the infrared or the far infrared spectrum, this difference frequency may be made to have a wavelength of between one-hundredth and several tenths of a millimeter, rather than the wavelength of light. It is quite practicable to transmit a picture of a hologram interference pattern which is a function of a difference or beat frequency having a wavelength of this magnitude.

It is therefore an object of the present invention to produce a hologram composed of an interference pattern which is a function of the difference frequency between first and second given frequencies.

It is a further object of the present invention to produce holograms derived from X radiation.

It is a still further object of the present invention to record a visual scene in the form of a hologram composed of an interference pattern which is a function of a wavelength which is much greater than the wavelength of light, to reconstruct the visual scene from such a hologram, and to transmit and receive by means of television the interference pattern of which such a hologram is composed.

These and other objects, features and advantages of the present invention will become more apparent from the following detailed description taken together with the accompanying drawings in which:

FIG. 1 shows a block diagram of apparatus for recording a beat frequency hologram of an object illuminated with X-rays;

FIG. 2 shows a block diagram of apparatus for recording a hologram of an object illuminated with light rays;

FIG. 3 shows a block diagram of television apparatus for transmitting a picture of a beat frequency hologram to a remotely located receiver;

FIG. 4 shows television apparatus for receiving and reconstructing a beat frequency hologram transmitted thereto, and FIG. 5 shows apparatus for recording on film beat frequency holograms to be reconstructed and projected on the screen of a movie theater to thereby provide a three-dimensional motion picture.

Referring now to FIG. 1, there is shown spatially coherent two frequency X-ray energy source 100 which emits a beam 102 of X-rays at first and second respective predetermined frequencies. These two predetermined frequencies are chosen so that they differ from each other by a frequency within the light spectrum. A first portion 103 of beam 102, as shown, impinges upon long metal mirror 104 at a small glancing angle of incidence which is no greater than one degree. Mirror 104 reflects first portion 103 to form reference beam 106 which is directed to the surface of non-linear recording medium 108. A second portion 110 of beam 102 strikes object 112 which selectively absorbs some of the X radiation transmitted therethrough to form information beam 114. Information beam 114 is also directed to the surface of non-linear recording medium 108. Non-linear recording medium may be, for instance, Kodak high resolution photographic plate Type 649, which has a response which is non-linear with respect to the quantity of electromagnetic energy applied to any point thereof.

As shown, reference beam 106 and information beam 114 strike the surface of nonlinear recording meduim 108 at different angles. Since the radiation from source 100 is spatially coherent, the first frequency component of reference beam 106 and information beam 114 will produce a first interference pattern on the surface of non-linear recording medium 108 having fringes spaced from each other by an amount which is a function of the frequency of the first frequency component. Similarly, the second frequency component of reference beam 106 and information beam 114, respectively, will produce a second interference pattern on the surface of non-linear recording medium 108 which has fringes which are spaced from each other by an amount which is a function of the frequency of the second frequency component. Each of the first and the second interference patterns, respectively, manifest a hologram of object 112. Since both the first and second frequency components are within the X-ray spectrum, the spacing between the fringes thereof is so small relative to the ultimate resolving power of non-linear recording medium 108 that they are not recorded on non-linear recording medium 108.

However, since the first interference pattern is a function of the frequency of the first frequency component while the second interference pattern is a function of the frequency of the second frequency component, the respective positions of the fringes of the first interference pattern will slip with respect to the respective positions of the second interference pattern by an amount which is a function of the difference between the respective frequencies of the first and second frequency component. Thus, at certain positions on the surface of non-linear recording medium 108 the maxima of the first interference pattern will overlap the maxima of the second interference pattern, while at other positions on the surface of non-linear recording medium 108 the maxima of the first interference pattern will overlap the minima of the second interference pattern. The spacing between these two situations will be a function of the difference or beat frequency between the respective frequencies of the first and second frequency components. Thus, a third interference pattern, which is a function of this difference or beat frequency, is formed on the surface of non-linear recording medium 108. Since recording medium 108 is non-linear, the cross-product terms between the first and second frequency components result in the difference or beat frequency between the first and second frequency components being produced. Further, since this difference or beat frequency is within the light spectrum, and is therefore within the resolving power of recording medium 108, the third interference pattern will be recorded on the surface of non-linear recording medium 108. This recorded third interference pattern manifests a hologram of object 112.

If after non-linear recording medium is developed, a beam of monochromatic spatially coherent light is shone therethrough, the hologram manifested by the third interference pattern will be reconstructed to provide both a virtual and a real image of object 112 in a manner well known in the hologram art. In this manner a three dimensional X-ray picture of an object may be produced.

Referring now to FIG. 2, there is shown spatially coherent two frequency light energy source 200. This may be, for example, a Q-switched ruby laser which may be made to simultaneously emit radiation at wavelengths of 6,943 angstroms and 6,929 angstroms. The wavelength of the difference frequency between the frequency corresponding to 6,929 angstroms and the frequency corresponding to 6,943 angstroms is 0.35 mm. This is within the far infrared or microwave portion of the electromagnetic spectrum.

Spatially coherent two frequency light energy source 200 emits beam 202 which is divided by beam splitting mirror 204 into first component beam 206 and second component beam 208. First component beam 204, after being widened by means of lenses 209 and 210, forms reference beam 212 which is directed to the surface of non-linear recording medium 214. Second component beam 208, after being reflected by mirror 216, widened by means of lenses 218 and 220 and diffused by means of diffuser 222, illuminates object 224. Diffuser 222 is essential if object 224 is a transparency, but may be omitted if object 224 is three dimensional. In response to being illuminated, object 224 produces information light flux 226 by scattering or reflecting the light impinging thereon. At least a portion of information light flux 226 impinges upon the surface of non-linear recording medium 214 at an angle with respect to reference beam 212. This results in an interference pattern being formed on the surface of non-linear recording medium 214 which interference pattern is a function of the beat or difference frequency between the first and second frequency components emitted from spatially coherent two frequency light energy source 200 in the same manner as previously described in connection with FIG. 1. However, in this case, the beat or difference frequency is not within the light spectrum as in the case of the embodiment shown in FIG. 1, but is in the far infrared or microwave region of the electromagnetaic spectrum. The recording medium can obviously be a photographic plate as was described before in the X-ray application. This is useful when storage can be tolerated. However, where direct recording and transmission is desired, non-linear recording medium 214 is not a photographic plate, as is non-linear recording medium 108 of FIG. 1, but may be a photo cathode of a television vidicon composed of a layer of cadmium sulphite or lead oxide, both of which exhibit a non-linear response in respect to the intensity of radiation falling on each point thereof, or non-linear recording medium 214 may be composed of a photo conductor material which exhibits non-linear characteristics.

Referring now to FIG. 3, there is shown television transmitting apparatus comprising television camera means 300, which includes a vidicon having a photo cathode 302 composed of a non-linear recording medium such as cadmium sulphide or lead oxide. Photo cathode 302 may have dimensions in the order of 250 mm. Impinging on photo cathode 302 are reference beam 304, identical to reference beam 212 of FIG. 2 and information light flux 306, identical to information light flux 226 of FIG. 2. Therefore, a hologram interference pattern of the illuminated object will be formed on the surface of photo cathode 302 which is a function of the beat or difference frequency between the two frequency components in reference beam 304 and light flux 306. This difference or beat frequency has a wavelength in the far infrared or microwave region of the electromagnetic spectrum. Of course, additional hologram interference patterns will be formed on photo cathode 302 which are functions of the individual first and second frequency components, respectively, which are in the light portion of the electromagnetic spectrum.

Television camera means 300 also includes means for scanning photo cathode 302 with an electron beam to convert that interference pattern on photo cathode 302 which is a function of the beat or difference frequency between the two frequency components into a video signal which appears at the output of television camera means 300. Since the width of the scanning electron beam is too large to resolve the additional interference patterns which are respective functions of the individual first and individual second light frequency components, the video signal appearing at the output of television camera means 300 contains information only of that interference pattern on photo cathode 302 which is a function of the beat or difference frequency. This video signal is transmitted by closed lines or microwaves to a remote receiver by means of television transmitter 308. Because photo cathode 302 has dimensions in the order of 250 mm. and the distance between fringes of the hologram interference pattern to be transmitted is in the order of several tenths of a millimeter, the entire interference pattern displayed on photo cathode 302 includes approximately five to six hundred thousand picture elements. If pictures are transmitted at a frame rate of thirty per second, the same as in conventional television, the highest video frequency signal will be between fifteen and eighteen megacycles. Although this is too wide a bandwidth to be transmitted over the usual 6 mc. bandwidth broadcast television channel, it may be easily transmitted over closed lines or by means of microwaves. A wide choice is open, of course, as to the fidelity of reconstruction desired and the bandwidth one is willing to provide for this purpose.

Referring to FIG. 4, there is shown aparatus for receiving the signal transmitted from the apparatus shown in FIG. 3. More particularly, television receiver 400 receives the signal transmitted from the television transmitter and is effective in detecting the transmitted video signal. Electron beam 402 of cathode ray tube 404, which forms the output of television receiver 400, is intensity modulated in accordance with this detected video signal. Furthermore, television receiver 400 includes means for causing electron beam 402 to scan face plate 406 of cathode ray tube 404 in synchronism with the scanning of photo cathode 302 by television camera means 300. Face plate 406 is composed of a material such as barium titanate or strontium titanate, which has an absorption response in the far infrared region of the electromagnetic spectrum that is strongly effected by electric charge. Scanning electron beam 402, which is intensity modulated in accordance with the detected video signal, is effective in writing a charge pattern on the surface of face plate 406 which spatially corresponds with the beat or difference frequency hologram interference pattern appearing on photo cathode 302 of television camera means 300. Face plate 406 is illuminated by spatially coherent monochromatic far infrared radiation from far infrared source 408, as shown. Far infrared source 408 may be a klystron, magnetron, far infrared laser or other source which produces radiation at a frequency equal to or at least of the same order as that of the beat or difference frequency. Therefore, the electric charge pattern on face plate 406 modulates the far infrared radiation from source 408 transmitted therethrough to reconstruct a wave having the frequency of the radiation from far infrared source 408 which bears three-dimensional information of the object being televised.

In order to view the object, it is, of course, necessary to convert the far infrared frequency of beam 410 emerging from face plate 406, which includes the aforementioned reconstructed wave, from a frequency in the far infrared region of the electromagnetic spectrum to a frequency in the light region of the electromagnetic spectrum. In order to accomplish this, non linear transmission medium 412, which may be composed of a crystal such as KDP, LiNbO$_3$ or GaAs, is simultaneously illuminated by infrared beam 410 and by spatially coherent monochromatic light 413 from monochromatic light source 414 which is applied thereto through lens 416. Non-linear transmission medium 412 is effective in mixing the frequency of light 413 with the frequency of beam 410 to transmit therethrough not only the frequency of light 413, but the upper and lower side bands produced by the mixing of beams 410 and 413. On the other side of non-linear transmission medium 412 is filter 418 which has a characteristic which absorbs the frequency of light 413, but passes at least one and preferably both of the side bands. Light radiation 420 emerging from filter 418 has all the properties of reconstructed holograms. It will form a real image of the televised object or will permit a virtual image of the televised object in three dimensions to be viewed.

Referring now to FIG. 5, there is shown another embodiment of the present invention for recording a hologram interference pattern which is a function of the difference frequency between two light frequencies on movie film. More particularly, as shown in FIG. 5, a large screen, the size of a conventional movie screen, composed of a layer of non-linear photo conductor 500 in intimate contact with similarly sized electroluminiscent panel 502. An alternating voltage 504 is applied across non-linear photoconductor 500 and electroluminiscent panel 502 in series with each other, as shown. The outer surface of non-linear photo conductor 500 is illuminated with reference beam 506, which is identical to reference beam 212 in FIG. 2, and by information light flux 508, which is identical to information light flux 226 of FIG. 2, to thereby produce a hologram interference pattern on the outer surface of non-linear photo conductor 500. Those portions of the surface of non-linear photo conductor 500 which coincide with the dark fringes of this interference pattern, resulting from destructive interference, exhibit a very high resistance, while those portions of the surface of non-linear photo conductor 500 which coincide with the bright fringes of this interference pattern, resulting from constructive interference, exhibit relatively low resistance. Only those portions of electroluminiscent panel 502 which are in contact with low resistance portions of non-linear photo conductor 500, corresponding solely to the bright fringes of the interference pattern, will luminesce. Therefore, the hologram interference pattern is converted into a corresponding light pattern by means of non-linear photo conductor 500 and electroluminiscent panel 502. This corresponding light pattern is projected by means of lens 510 on a frame of movie film 512. Thus, a pattern identical in configuration to the interference pattern appearing on the surface of non-linear photo conductor 500 will be recorded on film 512. The larger distance between bits of information in the beat hologram as compared to the distance in the original hologram, makes it possible to reduce the beat hologram by optical demagnification to ordinary movie film size.

After the film is developed, the hologram interference pattern recorded on film 512 may be utilized to reconstruct a three-dimensional image of the photographed object by projecting a magnified image of the hologram pattern recorded on film 512 on a two-layer screen with a voltage applied thereacross, which is configured similarly to the two-layer screen composed of non-linear photo-conductor 500 and electroluminiscent panel 502, but which is composed instead of a layer of photo conductor in intimate contact with a layer of material such as barium titanate or strontium titanate. The layer of barium titanate or strontium titanate is irradiated with spatially coherent monochromatic infrared radiation to reconstruct a hologram in the manner described above in connection with FIG. 4. Also, as described above in connection with FIG. 4, the reconstructed hologram at the far infrared frequency is converted back to light by means of elements identical to monochromatic light source 414, lens 416, non-linear transmission medium 412 and filter 418 to thereby display a three-dimensional motion picture.

Although only certain preferred embodiments of the present invention have been disclosed herein, it is not intended that the invention be restricted thereto. For instance, spatially coherent to frequency light energy source 200 may be replaced by three such sources each providing two frequencies of light at different colors within the light portion of the electromagnetic spectrum, to thereby provide color pictures, rather than monochromatic pictures. Further, greater depth resolution may be achieved by utilizing a difference or beat frequency in the infrared, rather than the far infrared, region of the electromagnetic spectrum. It is therefore intended that this invention be limited solely by the true spirit and scope of the appended claims.

What is claimed is:

1. In an apparatus for recording an image on an electromagnetic energy recording surface medium having a response at each point thereof which is a predetermined single-valued non-linear function of electromagnetic radiation energy impinging on that point, said apparatus comprising means for exposing said surface medium to an information component of radiation obtained from an object illuminated with radiation from a spatially coherent source of electromagnetic energy composed of energy of substantially first and second given frequencies and for simultaneously exposing said surface medium to a reference component of radiation directly obtained from said source, whereby an image is recorded on said surface medium which includes a hologram composed of an interference pattern which is a function of the difference frequency between said first and second given frequencies.

2. The combination defined in claim 1, wherein said first and second frequencies are both higher than the visible light spectrum and said difference frequency is within said visible light spectrum.

3. The combination defined in claim 1, wherein said first and second frequencies are in the X-ray spectrum.

4. The combination defined in claim 1, wherein each of said first and second frequencies is in the visible light spectrum and said difference frequency is within the portion of the electromagnetic spectrum which includes microwaves, far infrared and infrared.

5. The combination defined in claim 1, further including television camera means having a photo-responsive surface which comprises said recording surface medium and scanning means for converting said image on said photo-responsive surface into a video signal, said television camera means having a predetermined maximum resolving power which is capable of resolving said hologram interference pattern but which is incapable of resolving an interference pattern which is a function solely of said first frequency or said second frequency.

6. The combination defined in claim 5, further including a receiver and means for transmitting said video signal to said receiver, said receiver including a second spatially coherent source of electromagnetic energy at a third frequency which is of the same order of magnitude as said difference frequency, a third spatially coherent source of electromagnetic energy at a fourth frequency which has at least one beat frequency with respect to said third frequency within the visible light spectrum, reconstruction means responsive to said video signal for spatially modulating radiation from said second spatially coherent source in accordance with said video signal to thereby reconstruct the image recorded in said hologram as a function of said third frequency, and means including beat frequency mixing means for mixing said spatially modulated radiation from said reconstruction means with said fourth frequency to produce an output which includes the reconstructed image recorded in said hologram as a function of said one beat frequency.

7. The combination defined in claim 6, wherein said reconstruction means includes cathode ray means having means producing an electron beam and a target sheet composed of a material having an absorption characteristic to electromagnetic energy of said third frequency which is in accordance with the magnitude of the electric charge at that point, means for intensity modulating said electron beam in accordance with said video signal, scanning means synchronized with said first-mentioned scanning means for scanning said target sheet with said electron beam, and means for irradiating said target sheet with electromagnetic energy of said third frequency.

8. The combination defined in claim 6, wherein said fourth frequency itself is within the visible light spectrum and wherein said means including beat frequency means further includes filter means having the output of said mixing means applied thereto for rejecting said fourth frequency but passing said one beat frequency.

9. The combination defined in claim 8, wherein the other beat frequency between said third and fourth frequencies is within said visible light spectrum and said filter means passes said other beat frequency.

10. The combination defined in claim 6, wherein said fourth frequency is intermediate said first and second frequency.

OTHER REFERENCES

A Two-Color Photograph from Captured Light Waves, Bell Laboratories Record, November 1965, vol. 43, No. 10, p. 416.

Hologram Transmission via Television, Bell System Technical Journal, February 1966, vol. 45, No. 2, pp. 335–339.

Requirements for a Wavefront Reconstruction Television Facsimile System, Journal of the SMPTE, vol. 74, No. 10, October 1965, pp. 893–896.

ROBERT L. GRIFFIN, *Primary Examiner.*

RICHARD K. ECKERT, JR., *Assistant Examiner.*

U.S. Cl. X.R.

96—27; 178—6.8; 350—3.5